United States Patent
Berry et al.

(10) Patent No.: US 9,681,520 B1
(45) Date of Patent: Jun. 13, 2017

(54) PHOTOSENSOR EMPLOYING A FIBER OPTIC COLLECTOR

(71) Applicant: Universal Lighting Technologies, Inc., Madison, AL (US)

(72) Inventors: Travis L. Berry, Madison, AL (US); John Cavacuiti, Burnaby, CA (US); Rob Mahaffey, Burnaby, CA (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 15/233,365

(22) Filed: Aug. 10, 2016

Related U.S. Application Data

(60) Provisional application No. 62/203,201, filed on Aug. 10, 2015.

(51) Int. Cl.
*H05B 37/00* (2006.01)
*H05B 37/02* (2006.01)
*G01J 1/04* (2006.01)
*F21V 23/00* (2015.01)
*F21V 8/00* (2006.01)
(Continued)

(52) U.S. Cl.
CPC ....... *H05B 37/0218* (2013.01); *F21V 23/006* (2013.01); *G01J 1/0425* (2013.01); *G02B 6/0096* (2013.01); *H05B 33/0815* (2013.01); *H05B 33/0854* (2013.01); *H05B 37/0272* (2013.01); *F21Y 2115/10* (2016.08)

(58) Field of Classification Search
CPC .... H05K 1/144; H05K 1/189; B60Q 2300/41; B60Q 2300/42; B60Q 1/04; B60Q 1/085; B60Q 1/1423; B60Q 2300/054; B60Q 2300/112; B60Q 2300/116; B60Q 2300/122; B60Q 2300/134; B60Q 2300/142
See application file for complete search history.

(56) References Cited

U.S. PATENT DOCUMENTS

| | | | |
|---|---|---|---|
| 2004/0148057 A1* | 7/2004 | Breed | B60Q 9/008 700/242 |
| 2010/0294961 A1* | 11/2010 | Ashdown | G01J 1/04 250/552 |
| 2012/0206050 A1* | 8/2012 | Spero | B60Q 1/04 315/152 |

OTHER PUBLICATIONS

Ferguson, Bruce: (2004) Optical Design of Ambient Light Sensor, AN-32 Optical Design, Microsemi Integrated Products, Garden Grove, CA.

* cited by examiner

*Primary Examiner* — Monica C King
(74) *Attorney, Agent, or Firm* — Patterson Intellectual Property Law, PC; Mark J. Patterson; Gary L. Montle

(57) ABSTRACT

A lighting control system for a light fixture has an ambient light sensor mounted therein. A switching circuit provides power for driving lighting sources. A controller receives signals from the light sensor and regulates switching frequencies based on desired lighting output level and the ambient light condition. An ambient lighting channel extends from the ambient light sensor to an aperture between outer and inner surfaces of the housing. The ambient lighting channel may include a fiber optic light pipe which extends from the aperture to surround the light sensor. The fiber optic light pipe may extend through the aperture from the ambient light sensor to an ambient light source external to the light fixture. The light sensor may mount on a shared PCB with respect to the lighting sources, such as an LED array, and (Continued)

transmit ambient lighting information to the controller via a feedback loop.

25 Claims, 2 Drawing Sheets

(51) Int. Cl.
*H05B 33/08* (2006.01)
*F21Y 115/10* (2016.01)

PHOTOSENSOR EMPLOYING A FIBER OPTIC COLLECTOR

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/203,201, filed Aug. 10, 2015, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to driven lighting sources such as LED light fixtures. More particularly, the present invention relates to lighting control systems implementing ambient light sensors for regulating lighting output from a light fixture.

It is relatively common practice to achieve energy savings via the use of light sensors (e.g., photocells or photo-sensors) to measure natural or ambient light (e.g., sunlight) in a defined area such as a room and to accordingly adjust the artificial or electrical light. In fact, this practice is mandatory in a number of U.S. states, and is often referred to as Daylighting or Daylight Harvesting. In practice, the light sensor determines how much artificial light is necessary to maintain a desired level of illumination within the area. When there is no natural light, the light sensor will relay this information to a local or remote controller, which will signal or otherwise directly control the ballast to operate at its pre-programmed maximum level. When the light sensor detects natural light, the controller will dim the ballasts by an equivalent amount so that the total illumination of the room does not change.

There are a number of issues with the use of external photo-sensors for this purpose, including for example the cost and the undesirable size of the components as needed for mounting with respect to the light fixture. Photo-sensors also require a separate power source and a communication interface to the light fixture in order to properly regulate the driven lighting source.

For example, the most common construction method for LED modules to be used in light fixtures is mounting light emitting diode elements (LEDs) directly to a printed circuit board (PCB). Mounting an ambient light sensor on the existing PCB of an LED module would alleviate or simplify all of the issues with external photo-sensors. However, the high levels of electrical light on the LED module would make it very difficult to measure the ambient or natural light in the room directly from the PCB.

BRIEF SUMMARY OF THE INVENTION

An invention as disclosed herein relates to systems and devices which provide for ambient light measurement from a remote source with respect to an LED module having PCB-mounted LEDs, or even completely external with respect to an associated light fixture.

An invention as disclosed herein, unless otherwise expressly noted, is not limited to LED fixtures but rather an ambient light sensor may be used to control fluorescent or other types of light sources.

In one embodiment of a lighting control system according to the present disclosure, a light fixture is provided having a housing with an outer surface and an inner surface, and one or more driven lighting sources mounted within the housing. An ambient light sensor is also mounted within the housing and generates signals representative of an ambient light condition. A switching circuit provides power for driving the one or more lighting sources. A controller receives the signals from the ambient light sensor, and regulates an operating frequency of the switching circuit based on a desired lighting output level and the ambient light condition. An ambient lighting channel extends from the ambient light sensor to an aperture between the outer surface of the housing and the inner surface of the housing.

In one example of such an embodiment, the ambient lighting channel includes a fiber optic light pipe. The use of fiber optics may be preferred because of the minimal mechanical changes required in order to route the measurement source away from the PCB or outside of the light fixture.

In another example, the fiber optic light pipe extends from the aperture to surround the ambient light sensor.

In another example, the fiber optic light pipe extends through the aperture from the ambient light sensor to an ambient light source external to the light fixture.

In another example, the fiber optic light pipe has a diameter no greater than 1 mm.

In one embodiment of an LED lighting device as disclosed herein, a printed circuit board has one or more LED lighting elements mounted thereon, along with an ambient light sensor configured to generate signals representative of an ambient light condition. A fiber optic light pipe extends from a first end surrounding the ambient light sensor to a second end and configured to direct light from an ambient light source to the ambient light sensor.

In one example of such an embodiment, a wired feedback loop provides at least the ambient light sensor signals from the printed circuit board to a remote controller, which may regulate output power to the LED lighting elements based thereon.

In another example, a wireless communications module may be mounted on the printed circuit board for communicating the ambient light sensor signals to one or more remote devices. The remote devices may include, for example, portable user computing devices, a central dimming controller for an area such as, for example, a local building management system, one or more additional light fixtures in an area such as, for example, that may define a distributed lighting management system, or the like.

In another embodiment of a lighting control system as disclosed herein, a plurality of light fixtures are each provided with a housing with an outer surface and an inner surface, and one or more driven lighting sources mounted within the housing. At least one of the light fixtures further includes an ambient light sensor mounted within the respective housing to generate signals representative of an ambient light condition, a switching circuit to provide power for driving the one or more respective driven lighting sources, a controller to regulate an operating frequency of the switching circuit based on a desired lighting output level and the ambient light condition, and an ambient light channel extending from the ambient light sensor to an aperture between the outer surface of the housing and the inner surface of the housing. A feedback loop transmits the signals representative of the ambient lighting condition to controllers for one or more of the other light fixtures.

DETAILED DESCRIPTION OF THE INVENTION

Various exemplary embodiments of a lighting control system may now be described in detail. Such embodiments and features thereof are not intended as limiting upon the scope of an invention as disclosed herein, unless otherwise expressly stated.

Figure 1:
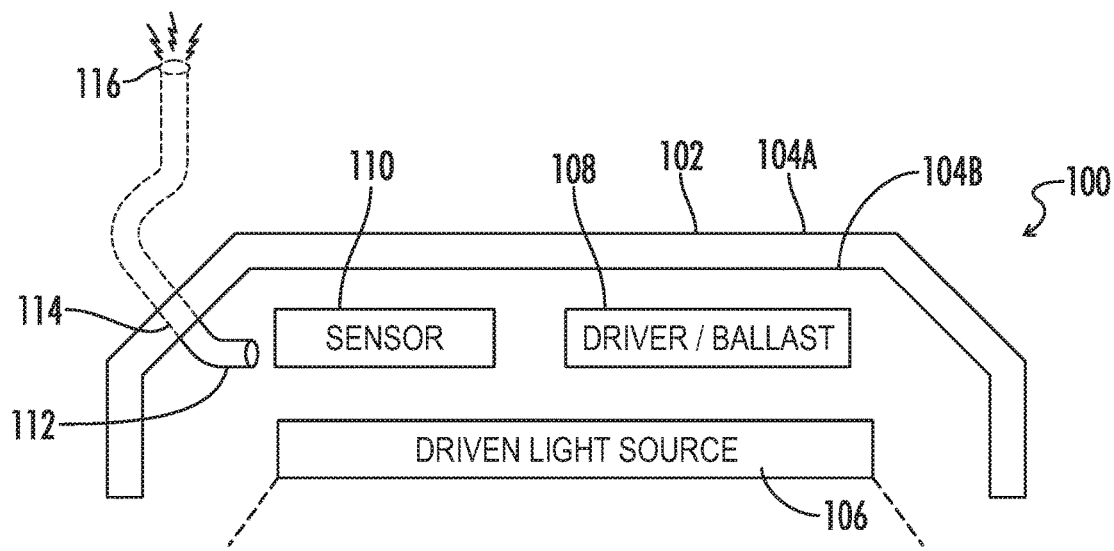
FIG. 1 is a block diagram representing an embodiment of a lighting control system as disclosed herein.

Referring first to FIG. 1, a system 100 may include a light fixture 102 having a housing 104 with an outer surface 104a and an inner surface 104b. A driven lighting source 106, a driver or ballast 108 and an ambient light sensor 110 are mounted or otherwise positioned within the light fixture housing 104. The driven lighting source 106 may in various embodiments include an array of one or more light emitting diodes (LEDs) coupled in series or in parallel, as driven by DC current provided from an LED driver 108 as known in the art. In other embodiments within the scope of the present disclosure, the driven lighting source 106 may include a fluorescent lamp or the equivalent as driven by AC power from an electronic ballast 108 as known in the art.

An ambient light sensor 110 may take any one of numerous forms as are well known in the art, such as, for example, a photo-detector which generates a signal in response to radiation exposure, further including or otherwise associated with circuitry for processing said signals and/or comparing said signals to stored reference values to determine an ambient lighting level, etc. In certain embodiments as further described below, the ambient light sensor 110 may simply provide signals to a driver controller for some or all of the processing and determination of ambient light levels or lighting conditions. The ambient light sensor 110 in certain embodiments may be configured for surface mounting to a printed circuit board (PCB) of an LED module as further described below.

An ambient light channel 112 may be configured for routing ambient light from an ambient light source 116 to the sensor 110. The channel 112 may be configured on a first end to substantially surround the sensor 110, for example having a width at least corresponding to a working area of the sensor 110 and with a minimal gap between the first end and the sensor as may required by physical constraints but otherwise effective to substantially prevent axis lighting from traversing the face of the sensor. The channel may further be configured on a second end for coupling with an aperture 114 between the inner and outer surfaces 104a, 104b of the fixture housing for receiving ambient light at the outer surface of the fixture, or alternatively may be configured to pass through such an aperture 114 for receiving ambient light from an ambient light source 116 at some distance external to the fixture. In the example shown only one ambient light channel 112 is represented, and such a configuration may be found practical for many applications thereof, but in various embodiments within the scope of the present disclosure it is considered that multiple ambient light channels 112 may be provided with respect to a single light fixture.

Figure 2:
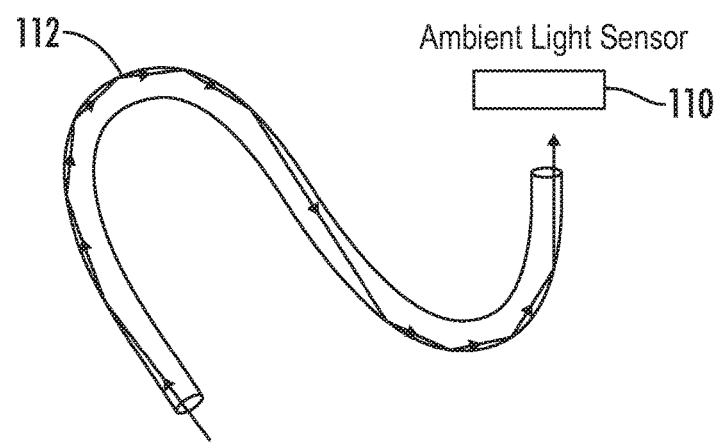
FIG. 2 is a perspective view of a representative embodiment of an ambient lighting channel as disclosed herein.

In an embodiment, the ambient light channel 112 may be a fiber optic light pipe which, with further reference to FIG. 2, may be an elongated and flexible cable having, for example, a diameter of 1 mm. The light pipe may be formed of a transparent material such as plastic or glass that acts as a light conduit, while having its sides polished and smooth if possible so as to reflect light and substantially prevent its escape.

In certain applications, the light pipe 112 may be positioned with respect to the light sensor 110 and the housing aperture 114 such that one or more bends or corners cause light propagating through the light pipe to strike one or more sides with an angle of incidence at or above a "critical angle" beyond which the light may pass through the pipe. Generally stated, in accordance with an optical principle known as "total internal reflection," light will be reflected when it hits a boundary between materials of different densities (as may be expected from, e.g., a fiber cladding surrounding a glass core) as long as the angle of incidence is less than the aforementioned critical angle. This principle is in effect regardless of whether the light pipe is maintained in a straight position or is flexibly positioned with one or more bends or corners, provided that the bends are within a certain tolerance. Accordingly, the outer surface of the light pipe may in certain embodiments be coated with a reflective coating, such as for example silver, so as to reduce the need to adhere to the critical angle criterion and the potential for light to leak out.

The use of fiber optics further provides a high level of flexibility and efficient routing of light from the ambient source to the ambient sensor, while much simpler and cheaper for example than mounting an external photo-sensor and routing the necessary power and data wiring.

Figure 3:
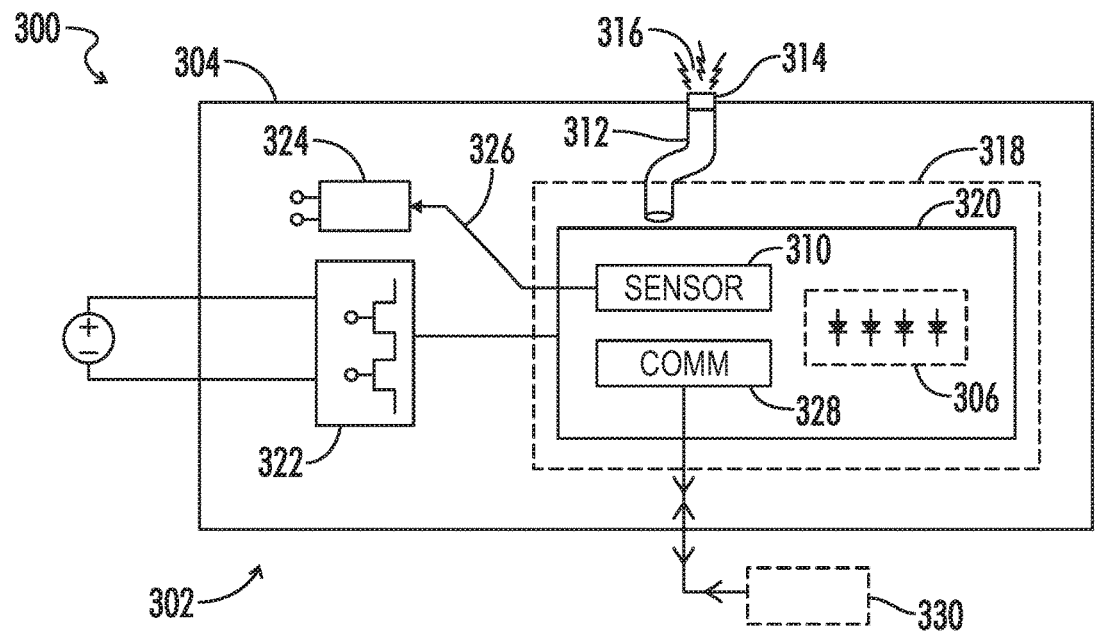
FIG. 3 is a block diagram representing another embodiment of a lighting control system as disclosed herein.
Figure 4:
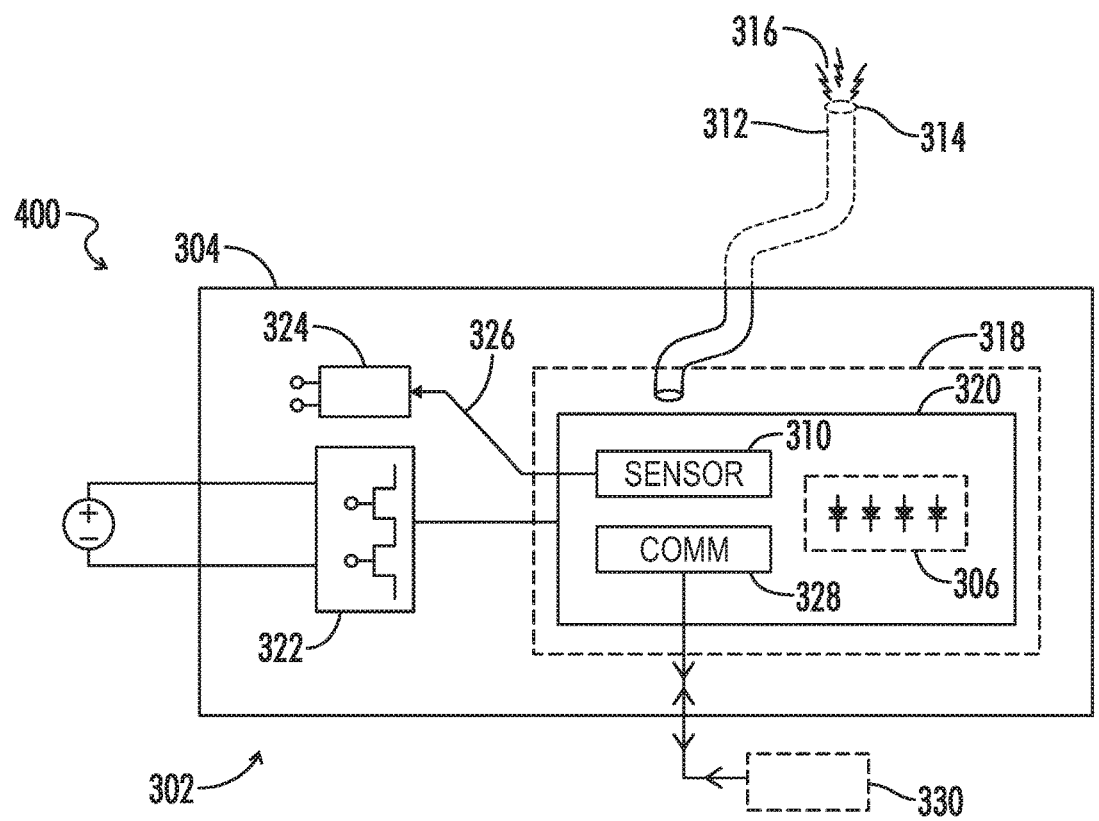
FIG. 4 is a block diagram representing another embodiment of a lighting control system as disclosed herein.

Referring next to FIG. 3, an embodiment of a lighting control system 300 may include an LED light fixture 302 with a housing 304 having an LED module 318 and an LED driver 308 positioned therein. As previously noted, the LED components and driver may be replaced with AC-driven lamps and associated electronic ballast without diverting from the present disclosure. The LED module 318 includes a printed circuit board (PCB) 320 having a driven lighting source (i.e., including LED elements) and an ambient light sensor 310 mounted on a surface of the PCB.

The LED module 318 is coupled to an LED driver 308 to receive DC power provided from a switching circuit 322 or switched mode power supply as known in the art. The driver 308 may receive input power from a DC power source, which is not shown but may include a rectifier circuit coupled to an AC power source and configured to provide a DC power input to the switching circuit 322, and in certain examples may further include a DC-DC converter for power factor correction (PFC circuit). The switching circuit 322 may include one or more pairs of switching elements configured in half- or full-bridge topologies to convert the DC input to AC power in accordance with an operating frequency of the switching elements. The AC power may in various embodiments be provided to an output rectifier via an isolation transformer (not shown) wherein a regulated DC output is provided to the driven lighting source 306. In certain embodiments, the switching circuit 322 provided in the light fixture may be unnecessary for regulating current through the driven lighting sources.

A controller 324 is configured for automated continuous dimming capability, or in other words to regulate the operating frequency of the switching elements 322 and thereby the DC output power to the driven lighting source 306, based on a desired lighting output. In accordance with daylight harvesting techniques as known in the art and previously described, the controller 324 may be coupled to the ambient light sensor 310 via a feedback loop 326 from the LED module 308 to determine a necessary lighting output from the LED fixture in order to supplement the ambient light in a defined area and provide the desired lighting output in said area.

Additional feedback for controller input and consideration may be provided from the LED module 308 or other components (not shown) as pertaining to for example a current through the driven lighting source 306 or an actual (measured) lighting output from the driven light source 306.

In some embodiments, a communications module 328 as known in the art such as, for example, a wireless communications module 328 may be mounted to the PCB 320 of the LED module 318 and configured to receive signals from the ambient light sensor 310 and to transmit the signals to one or more remote devices 330, which may, for example, include one or more other light fixtures 302 in the lighting control system 300. The communications module 328 may further or in the alternative be configured to receive signals from remote devices 330 for the purpose of conveying to the controller 324 a desired lighting output level or the like. The communications module 328 may alternatively be mounted within or proximate to the LED driver 308, but in such cases may require additional components such as an external antenna due to the mechanical constraints imposed by for example the metal LED driver housing.

The communications module 328 may be configured to communicate the ambient light sensor signals to, or receive lighting output control settings from, one or more remote devices 330 including for example portable user computing devices, a central dimming controller for an area such as for example a local building management system or multi-zone Programmable Logic Controller (PLC)/server, one or more additional light fixtures in an area such as for example may define a distributed lighting management system, or the like.

Similarly with respect to the previously disclosed embodiments, an ambient light channel 312 such as a fiber optic light pipe 312 may extend from the ambient light sensor 310 to an aperture 314 in the housing 304 of the fixture 302. The top portion of the channel 312 corresponding to the aperture may further have a lens and optionally a light diffusing component across the aperture, which may preferably be flat, but otherwise recessed or protruding within the scope of the present disclosure.

In another embodiment of a lighting control system 400 as disclosed herein, the elements may substantially correspond to those in the previous embodiment 300, with the primary exception being extension of the ambient light channel 312 through an aperture 314 in the light fixture housing 304 and to a remote ambient light source 316. Such an embodiment may be preferable for open-loop systems which seek to determine the amount of available sunlight, as weighed against for example the additional length and associated issues in routing, securing and aesthetically accommodating the channel (e.g., light pipe).

In one example, it may be desirable to simply collect and sense "ambient light" in the context of all combined light as provided by natural and driven sources, and as reflected off walls and other objects in a defined area. In such examples, it may be sufficient to provide an ambient light sensor which simply avoids direct exposure and/or interference from light emitted by the driven lighting source, such as for example the outside of the fixture housing.

Alternatively, for certain applications it may be desirable to collect and apply ambient light in the context of light outside of the defined area, such as for example as may be substantially unaffected by light from the driven light source but otherwise relevant to open-loop daylight harvesting considerations. In such examples, it may be necessary to conduct the ambient light channel through not only the aperture but other walls or otherwise to other remote portions of the defined area such as against a window, etc.

Lighting control systems as disclosed herein may be implemented in any number or type of defined areas as may be considered by one of skill in the art, including but not limited to classrooms, gymnasiums, hallways, parking garages, retail space, conference areas, office space and the like.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The term "controller" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A lighting control system comprising:
a light fixture having a housing with an outer surface and an inner surface;
one or more driven lighting sources mounted within the housing;
an ambient light sensor mounted within the housing and configured to generate signals representative of an ambient light condition;
a controller configured to
receive the signals from the ambient light sensor, and
regulate an operating current to the one or more driven lighting sources based on a desired lighting output level and the ambient light condition; and
an ambient lighting channel extending from the ambient light sensor to an aperture between the outer surface of the housing and the inner surface of the housing.

2. The lighting control system of claim 1, further comprising a switching circuit configured to provide power for driving the one or more driven lighting sources, wherein the controller is further configured to regulate current through the one or more driven lighting sources by regulating an operating frequency of the switching circuit based on the desired lighting output level and the ambient light condition.

3. The lighting control system of claim 1, wherein the ambient lighting channel comprises a fiber optic light pipe.

4. The lighting control system of claim 3, wherein the fiber optic light pipe extends from the aperture to surround the ambient light sensor.

5. The lighting control system of claim 4, wherein the fiber optic light pipe extends through the aperture from the ambient light sensor to an ambient light source external to the light fixture.

6. The lighting control system of claim 5, wherein the fiber optic light pipe has a diameter no greater than 1 mm.

7. The lighting control system of claim 3, wherein the fiber optic light pipe comprises highly reflective side portions.

8. The lighting control system of claim 1, wherein the aperture in the housing has a diameter no greater than 1 mm.

9. The lighting control system of claim 1, wherein the ambient light sensor comprises a photodetector.

10. The lighting control system of claim 1, wherein the one or more lighting sources comprise one or more light emitting diodes.

11. The lighting control system of claim 10, further comprising a printed circuit board having the one or more light emitting diodes and the ambient light sensor mounted thereon, and wherein the printed circuit board is mounted in the light fixture housing.

12. The lighting control system of claim 11, further comprising a feedback loop for providing the ambient light sensor signals from the printed circuit board to the controller.

13. The lighting control system of claim 12, further comprising a wireless communications module mounted on the printed circuit board for communicating the ambient light sensor signals to one or more remote devices.

14. An LED lighting device comprising:
a printed circuit board having one or more LED lighting elements mounted thereon;
an ambient light sensor mounted on the printed circuit board and configured to generate signals representative of an ambient light condition; and
a fiber optic light pipe extending from a first end surrounding the ambient light sensor to a second end and configured to direct light from an ambient light source to the ambient light sensor.

15. The device of claim 14, wherein the fiber optic light pipe has a diameter no greater than 1 mm.

16. The device of claim 14, wherein the fiber optic light pipe comprises highly reflective side portions.

17. The device of claim 14, wherein the ambient light sensor comprises a photodetector.

18. The device of claim 14, further comprising a wired feedback loop for providing at least the ambient light sensor signals from the printed circuit board to a remote controller.

19. The device of claim 14, further comprising a wireless communications module mounted on the printed circuit board for communicating the ambient light sensor signals to one or more remote devices.

20. A lighting control system comprising:
a plurality of light fixtures each having a housing with an outer surface and an inner surface, and one or more driven lighting sources mounted within the housing, wherein at least one of said light fixtures further comprises:
an ambient light sensor mounted within the respective housing and configured to generate signals representative of an ambient light condition;
an ambient light channel extending from the ambient light sensor to an aperture between the outer surface of the housing and the inner surface of the housing; and
a feedback loop to transmit the signals representative of the ambient lighting condition to a controller;
wherein the controller is configured to
receive the signals from the ambient light sensors for the at least one of said light fixtures, and
regulate a lighting output for the driven lighting sources in each of the plurality of light fixtures based on a desired lighting output level and the ambient light condition.

21. The lighting control system of claim 20, wherein each of the plurality of light fixtures comprises a switching circuit configured to provide power for driving the one or more respective driven lighting sources, and the controller is further configured to provide control signals for regulating current through the one or more driven lighting sources by regulating an operating frequency of the switching circuit based on the desired lighting output level and the ambient light condition.

22. The lighting control system of claim 21, wherein the controller is remotely positioned with respect to each of the plurality of light fixtures, and configured to communicate with local controllers associated with respective ones of the plurality of light fixtures.

23. The lighting control system of claim 20, wherein the ambient lighting channel comprises a fiber optic light pipe extending from the aperture to surround the ambient light sensor.

24. The lighting control system of claim 23, wherein the fiber optic light pipe extends through the aperture from the ambient light sensor to an ambient light source external to the light fixture.

25. The lighting control system of claim 24, wherein the fiber optic light pipe comprises highly reflective side portions.

* * * * *